United States Patent [19]

Ogawa et al.

[11] 3,882,268

[45] May 6, 1975

[54] APPARATUS FOR SURVEYING PAVED SURFACE

[76] Inventors: Yukio Ogawa, 7-3, Iwakura Hanazono-cho, Kyoto; Haruo Miki, c/o Nikon Raina Ishikawadai-ryo, 22-4, 3-chome, Higashiyukigaya, Tokyo, both of Japan

[22] Filed: July 2, 1973

[21] Appl. No.: 375,860

[30] Foreign Application Priority Data

July 3, 1972 Japan ............................... 47-59555
July 3, 1972 Japan ............................... 47-59556

[52] U.S. Cl. ........ 178/6; 178/DIG. 1; 178/DIG. 36; 178/DIG. 38; 178/6.8; 239/150

[51] Int. Cl. ............................................. H04n 5/84

[58] Field of Search. 178/DIG. 1, DIG. 36, DIG. 38, 178/6.8; 239/150

[56] References Cited

UNITED STATES PATENTS

| | | | |
|---|---|---|---|
| 3,101,175 | 8/1963 | Brown, Jr. | 239/150 |
| 3,426,146 | 2/1969 | Seaman | 178/6.8 |

*Primary Examiner*—Robert L. Griffin
*Assistant Examiner*—Edward L. Coles

[57] ABSTRACT

Apparatus for surveying a paved surface comprising a television camera mounted on a vehicle adapted to travel on the surface such that the camera has a field encompassing the paved surface, and a receiver for producing an image of the field viewed by the camera. A scale is on the surface of the screen of the receiver and by adjustment of the vehicle and the camera thereon, the image can be so located with respect to the scale to position the camera in a determined position. A road marking mechanism, such as for painting road lanes, can be mounted on the vehicle to mark the road surface at a specific location.

5 Claims, 14 Drawing Figures

APPARATUS FOR SURVEYING PAVED SURFACE

BACKGROUND

1. Field of the Invention

This invention relates to apparatus for surveying a paved surface, such as a paved road or the like, using a television camera and a television receiver.

The term "surveying" used herein refers to measuring a paved surface for dividing the same into lanes or the like by painting, rivetting, tape-application, string-application, chalking or the like.

2. Prior Art

For surveying a paved surface, such as a road or a parking field, it has been usual hitherto to employ the manual effort of several workers. Namely, it is conventional to first mark locations on the surface after distance measuring is repeated by several persons using a surveying instrument, a tape measure or the like, and then a dividing line is drawn between the marks. This operation requires a great deal of labor and is very low in efficiency.

SUMMARY OF THE INVENTION

An object of this invention is to provide an apparatus whereby such surveying work, as above, can be carried out at high efficiency and safely.

According to the invention there is provided an apparatus for surveying a paved surface comprising a television camera means for photographing a paved surface, a television receiver means for receiving a signal from the camera means and including an image screen with a scale thereon, and means for advancing at least one of the television camera means or the television receiver means on said paved surface. The image of the paved surface and the scale enables an accurate survey of the road to be taken, for example, for applying markings onto the paved surface, such as lane markings at required locations.

DETAILED DESCRIPTION

Figure 1:
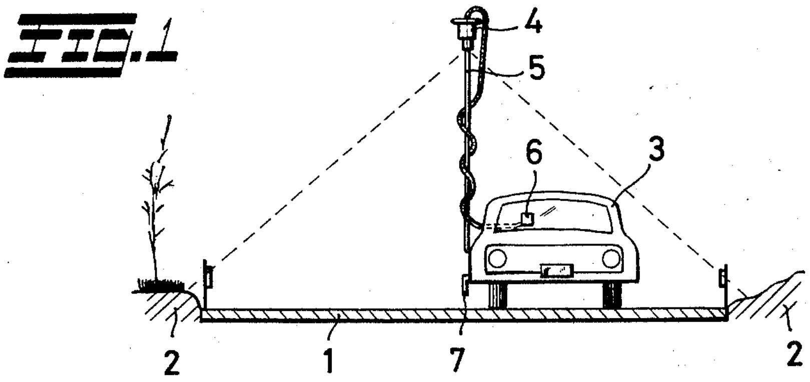
FIG. 1 is a front view of one embodiment according to this invention.

FIG. 1 shows an apparatus wherein a single television camera and a car are used in the case where a road surface is to be provided with a center dividing line by a painting operation.

In FIG. 1, numeral 1 denotes a paved surface, numeral 2 denotes an unpaved portion, (e.g. a road shoulder) numeral 3 denotes a car on which are mounted instruments 4 to 7 which will be described hereafter. Numeral 4 denotes an industrial television camera, numeral 5 denotes a camera supporting pole around which a television signal cable is wound, numeral 6 denotes a television receiver and numeral 7 denotes a painting gun.

Figure 2:
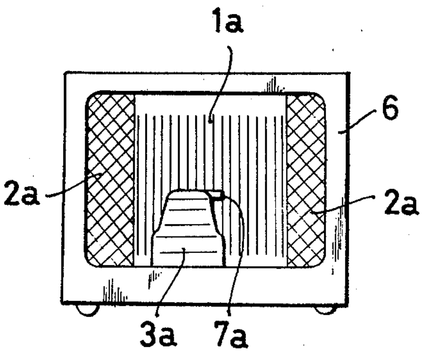
FIG. 2 is a front view of a television receiver which forms a portion of the embodiment of FIG. 1.
Figure 3:
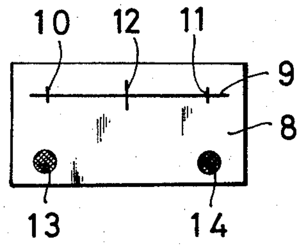
FIG. 3 is a front view of a scale plate used in the receiver.

The car 3 is now positioned nearly at the center of the road, that is, at the center of the paved surface 1, and the camera 4 is mounted on the supporting pole 5 so that it is facing vertically downwards and can view the road in a wide range. The distance of the camera from the surface 1 is 3 to 3.5 meters. The term "wide range" used herein includes both the meaning that the camera is placed at a substantial height above the road surface so that a wide range of field can be viewed and also that the lens is a comparatively long depth of focus and a wide angle so that a wide range of field can be viewed. It has been confirmed by experiments that, in comparison with the case where a standard lens is used, when a wide-angle lens or a super wide-angle lens is used, shaking of an image on the screen surface decreased even when the camera is vibrated during its travel. Hence, fatigue of a person observing the image is decreased and the output of a photo-electric convertor (to be described later) is stable). The painting gun 7 is located just below the camera 4. The type of lens of the camera 4 and the height of the camera 4 above the road are so related that, when the paved surface 1 and the unpaved portions 2, on the opposite outsides thereof are included in the visual field of the camera 4 and are received as images by the receiver 6, an image 1*a* of the paved surface 1 and an image 3*a* of the car 3 are viewed in the middle portion of the screen surface, with an image 7*a* of the painting gun 7 being viewed at the center thereof, and images 2*a*, of the opposite outside unpaved portions 2, are viewed on the opposite right and left sides of the screen surface as shown in FIG. 2. In this case, the image 2*a* is darker than the image 1*a*. Additionally, in front of the receiver 6 and, for example, at the lower half thereof, a semi-transparent plate 8 made of synthetic resin or the like as shown in FIG. 3 is fixedly placed and thereon are found a scale comprising a transverse line 9, opposite end marks 10, 11 whiich are symmetrical right and left and a center line 12. Alternatively, these lines constituting the scale can be directly placed on the front surface of the glass of a Braun tube in the receiver 6. An initial adjustment is made, i.e., fine adjustment of the camera height, the position of the painting gun or the like, such that the boundary lines between 1*a* and 2*a* coincide with the lines 10, 11 and at the same time the image 7*a* coincides with the center line 12. From this condition, the car 3 is moved slowly on the road. It is most desirable during its travel that the images and the scale limes completely coincide with each other, but it is permissible for the car 3 to move while a slightly deviated condition is measured by eye. If the road is constant in its width and the car travel direction is not deflected to the right or left, the foregoing boundary lines do not deviate from the lines 10, 11. Accordingly, if a driver drives the car 3 in such a manner that the images do not deviate from the foregoing condition and at the same time painting gun 7 is automatically or manually operated, a dividing line can be formed by painting the road. In this case, the painting is not necessarily a continuous painting, and it can be considered that properly spaced segments can be painted on the road and a continuous line may be applied thereafter by another means. Additionally, the painting operation can be readily replaced by riveting, tape application or the like.

Figure 4:
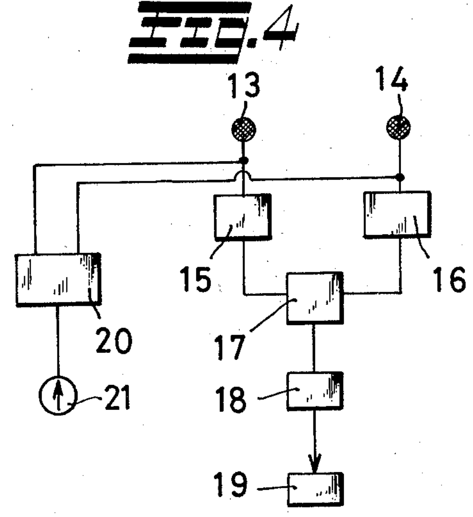
FIG. 4 is a diagrammatic illustration of an automatic control circuit.

Moreover, instead of the driver observing the image, an automatic control can be made by utilizing the fact that there is a difference in brightness between the images 1*a* and 2*a*. Namely, as shown in FIG. 3, photoelectric convertor elements 13, 14 are provided adjacent the opposite end lines 10, 11, respectively, and outputs of these elements 13, 14 are fed to a circuit as shown in FIG. 4. Namely, the outputs of the elements 13, 14 are fed to respective A-D convertors 15, 16, joined together by a logic circuit 17 and whose output is connected through a delay circuit 18 to an output circuit 19. The A-D convertors 15, 16 each comprises a switching circuit having a predetermined threshold level (a maximum and a minimum judging circuit) and it operates in such a manner that a pulse output is generated only when the output of the convertor element is above a predetermined level.

The logic circuit 17 is an AND circuit and operates in such a manner that an output is generated only when the outputs of the two A-D convertors 15, 16 are both positive. The delay circuit 18 is a type of integrated circuit which serves to prevent the output circuit 19 from immediately responding to the output of the logic circuit 17. The output circuit 18 may be, for example, a car direction automatic control circuit, a painting gun operating circuit, or the like.

Additionally, the outputs of the convertor elements 13, 14 are fed into a differential integrated amplifier 20 which in turn is connected to a meter 21 which is zero at its center. The meter 20 is operated by the output of amplifier 20 so that the driver can drive while observing right and left deflecting movement of the meter 21.

When, in the course of the above operation, the road width changes, the camera height is adjusted or the lens is replaced, and subsequently the operation can be continued.

Figure 7:
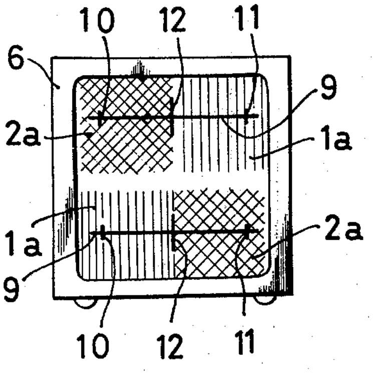
FIG. 7 is a front view of a portion of the same.
Figures 5, 6, 8, 9:
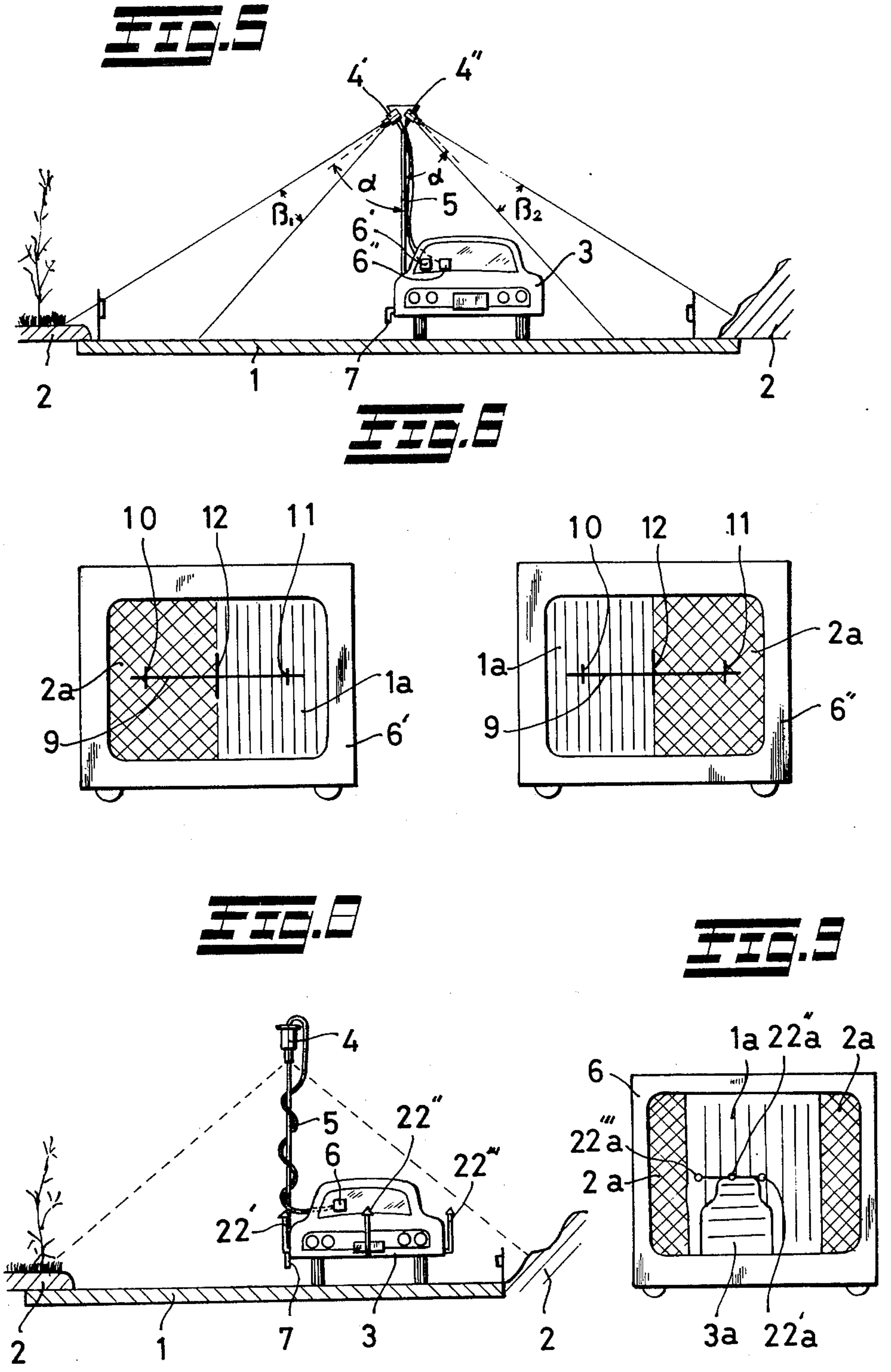
FIG. 5 is a front view of a modified embodiment according to this invention.
FIG. 6 is a front view of a television receiver portion thereof.
FIG. 8 is a front view of another modified embodiment according to this invention.
FIG.9 is a front view of a television receiver portion thereof.

Next, will be described the case where two television cameras and two television receivers are used. FIG. 5 shows such an embodiment which is especially effective when the road is larger in width than the case where a single television camera can be used. In this Figure, the two television cameras are denoted by 4′ and 4″, and the two television receivers are denoted by 6′ and 6″. The two cameras 4′, 4″ are fixedly attached at equal angles α, in relation to a vertical line extending from the painting gun 7. The paved surface 1 and the unpaved surface 2 are viewed in substantially equal halves by each of the cameras and their visual angles $\beta_1$, $\beta_2$ are equal to one another. The two receivers 6′, 6″ are each provided with a center line 12 in substantially the same manner as in the foregoing embodiment. Each of the receivers 6′, 6″ is so arranged that the boundary line between an image 1*a* of the paved surface 1 and an image 2*a* of the unpaved portion 2 coincides with the center line 12 as shown in FIG. 6. It may be also considered in this case, if desired, that a photoelectric convertor element as in the foregoing embodiment can be provided on the center line 12. It can be also considered that instead of using the two receivers 6′, 6″, image receiving is carried out by a single receiver by means of a coupling circuit. Since, in this case, the images are viewed in almost the same manner as shown in FIG. 2, the manner of operation is similar thereto. The image screen surface of the receiver 6 is not required to be of a standard type of broadcasting receiver having a vertical and lateral ratio of 3 : 4, but it may be of any aspect or circular or the like. It is especially convenient if a substantially square screen surface is used and the signals from the two cameras 4′, 4″ are composed in an upper and lower relationship by means of a coupling circuit as shown in FIG. 7. In this case, the paved surface 1 and the unpaved portion 2 on one side and those on the other side are imaged in reverse relationship on the upper portion and on the lower portion on the screen surface respectively and the boundary lines of the upper and lower images are vertically aligned with one another, so that observation of the images by the driver can be facilitated.

Figure 10:
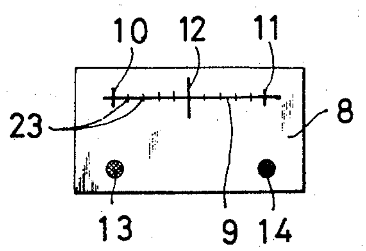
FIG. 10 is a front view of a scale plate used therein.

FIG. 8 shows an apparatus for application of a desired marking of the road by painting while measuring the road width. The apparatus in this case is substantially the same as in FIG. 1, except that three pilot light sources 22′, 22″ and 22‴ are additionally provided on the car 3. It has been established that in this case also, it is advantageous to use a wide-angle lens or a super wide-angle lens for the camera 4. The pilot light source 22′ and the painting gun 7 are located in alignment below the camera 4. The type of the lens of the camera 4 and/or the height of the camera 4 are so arranged that when the paved surface 1 and the opposite unpaved portions 2, are in the visual field of the camera 4 and are received as images by the receiver 6, the image 1*a* of the paved surface 1 and the image 3*a* of the car 3 are viewed at the middle portion of the image screen surface. Thus an image 22′*a* of the pilot light source 22′ is positioned at the center of the screen, images 22″*a*, 22‴*a* of the pilot light source 22″, 22‴ are disposed laterally therefrom, and the images 2*a*, 2*a* of the unpaved portions 2, 2 are viewed on the opposite right and left side portions, as shown in FIG. 9. The scale used in this embodiment is shown in FIG. 10. This scale is almost the same as that of FIG. 3 and is different only in that a large number of graduation lines or fine scale lines 23 are additionally provided on the line 9. A first adjustment is made such that the image 22′*a* of the pilot light source 22′ coincides with the center line 12. The distance between 22′ and 22″ and between 22′ and 22‴ are previously known, so that the value of each spacing of the graduation lines 23 can be determined from the positions of the images 22″*a*, 22‴*a* on the line 9. The image 7*a* of the painting gun 7 is in coincidence with the image 22′*a* of the pilot light source 22′, so that the former can be utilized instead of the latter in order to know the value of each interval between the graduation lines 23. If this is taken into consideration, the pilot light source 22′ is not always necessary and it is a minimum requirement that either one of the other pilot light sources 22″, 22‴ is required. However, it is preferable that the pilot light source 22′ and at least either one of the pilot light sources 22″, 22‴ are provided. For knowing the value of each interval between the graduation lines 23, it is convenient for the light sources 22'', 22''' to be adjustable right and left. Thus, the road width can be measured directly on the scale 23, e.g. in meters from the positions thereon of the boundary lines between the image 1*a* and the side images 2*a*. It is common that the distance on scale 23 is read from the center line 12, so that it is convenient for this reading that the graduation lines 23 of the same black color are varied in thickness at various points as shown in FIG. 10. Alternatively, the graduation lines 23 can be so varied in color that the opposite lines symmetrically positioned from the center line are of the same color and the lines adjacent one to another are of different colors such as blue, red, yellow, black or the like. In the case where, for example, such a necessity arises that painting must be applied at a location 2 meters from the road shoulder 2, the car position is first so determined that the distance between the image of the boundary line and the image 22'*a* of the pilot light source 22', that is, the image 7*a* of the painting gun 7 becomes 2 meters on the scale 33, and then the driver moves the car at a low speed while observing the images, whereby the desired line is applied by painting. In almost the same manner, for example, a line for three equal lanes can be drawn. The painting gun 7 may be designed to be adjustable to the right and the left, whereby it becomes possible for the car to travel along an imaginary center line of the road while the lines are applied on one side of the road. The automatic control circuit as shown in FIG. 4 can also be adopted in this embodiment.

Each of the pilot light sources 22', 22'', 22''' can be a conventional incandescent lamp, but it may also be an infrared lamp. If the infrared lamp is used and the camera is provided with an infrared filter, the lamp can be clearly observed on the image screen surface and additionally the paved surface and the unpaved portion can be clearly distinguished from each other thereon. If, additionally, those lamps are turned on and off by any known means, the confirmation of the same on the image surface can be facilitated and additionally the same can serve to give warning to other vehicles.

Next, same specific embodiments for applying a dividing line onto the paved surface will be explained with reference to FIGS. 11 to 14.

Figure 11:
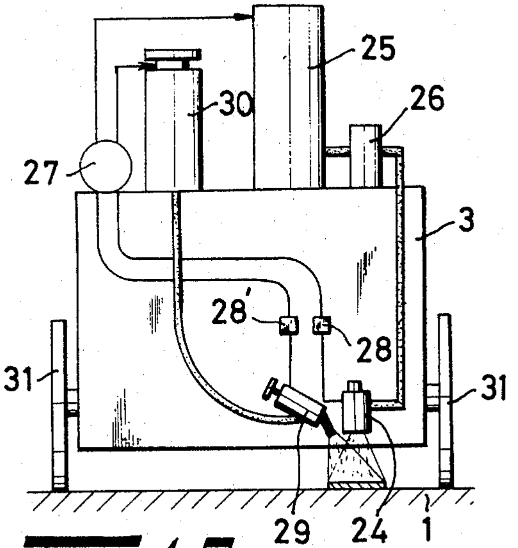
FIG. 11 is a diagrammatic illustration of a construction of a painting means.

FIG. 11 shows a construction used for applying pain to the paved surface 1. Therein, a paint gun 24, which corresponds substantially to the painting gun 7, is connected to a paint reservoir 25 via a heating chamber 26 and is so designed that it is opened when supplied with pressure air from an air tank 27 through an electromagnetic valve 28, whereby paint can be applied continuously or discontinuously to the road surface 1. In this case, a bead gun 29 connected to a bead tank 30 containing glass beads may be additionally provided, and the same is so designed as to be opened when supplied with pressure air from the air tank 27 through a second electromagnetic valve 28', whereby beads can be sprayed on the painted surface. These members are mounted on car 3 having wheels 31.

Figure 12:
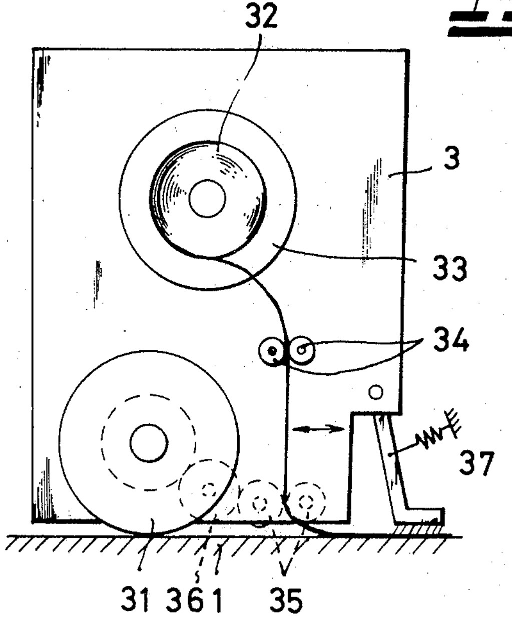
FIG. 12 is a diagrammatic illustration of a construction of means for applying a tape or a thread to a road surface.

FIG. 12 shows a construction for application of a tape or a thread onto the paved surface 1. A tape or thread 32 is wound on a drum 33, and one end of the tape or the thread 31 is unreeled and fed to the paved surface 1 through guide rolls 34 and pulling rolls 35. The pulling rolls 35 are connected to the wheel 31 of the car 3 through a connecting means 36, so that the wheels 35 may be driven by the wheel 31. A pressing shoe 37 is additionally mounted so that the tape 32 or the like can be applied to the road under pressure by the shoe.

Figure 13:
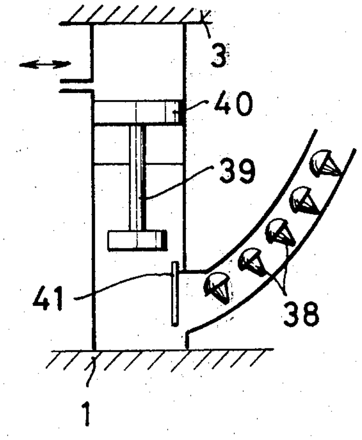
FIG. 13 is a diagrammatic illustration of a construction of means for riveting a road surface.

FIG. 13 shows a construction used in the case where rivets are applied to the paved surface 1. A rivet 38 is driven into the road surface 1 by the action of a riveting ram 39 operated by a pressure liquid supplied into a cylinder 40. Numeral 41 denotes a shutter for preventing excess supply of rivets.

Figure 14:
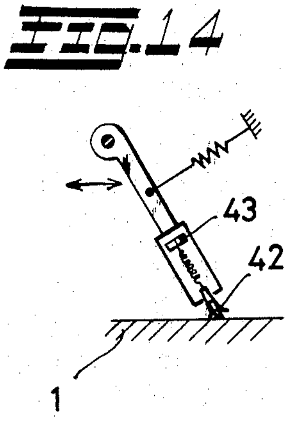
FIG. 14 is a diagrammatic illustration of a construction of means for chalking a road surface.

FIG. 14 shows a construction used for applying chalk to the paved surface 1. Namely, a piece of chalk 42 is held by a chalk holder 43 and the holder 43 is arranged to be controlled properly to continuously or periodically press the chalk against the road surface.

Various modifications can be employed as a matter of course and these may be used independently or in combination, as explained hereafter, in any of the foregoing embodiments.

1. The connection between the camera 4 and the receiver 6 can be a wireless connection, instead of the connection by means of the signal cable as shown.

2. Both the camera 4 and the receiver 6 need not be mounted on the car 3 and only one of them can be mounted on the car 3. For example, the camera 4 can be movable with the car 3 but the receiver 6 can be placed in a stationary position such as on the ground. In this case, the car 3 is remotely controlled from the position of the receiver 6. Alternatively, the receiver 6 can be movable with the car 3 and the camera 4 placed in a stationary position.

3. The car 3 can be either motorized or non-motorized.

4. Instead of indicating the deviation of the images to the right or the left by the meter 21 or as observed by the driver, such deviation can be indicated by an audible or visible signal.

5. The paved surface 1 to be surveyed, need not always be limited to one having unpaved portions 2, on both sides thereof. For example, one side can be unpaved, but the other side can be a white line previously applied, or both sides can be white lines.

6. The camera 4 need not be directed vertically downwards but rearwardly downwards, whereby the condition of the road at the rear of the car 3 is viewed on the image screen surface and thus the condition of the painted line previously applied can be observed. In this case, the images on the image screen surface are reversed in a right and left relationship from the actual viewing field, for example, by reversing the connection of the horizontal deflection coil in the receiver or that of such coil in the camera.

7. Instead of directly applying the scale onto the front surface of the receiver 6 or placing the same in front of the receiver, a modification can be made in which a transparent plate, on which the scale is applied, is placed in front of the lens of the camera 4 so that the scale may be imaged on the image screen surface of the receiver 6. Alternatively, a television camera can be provided exclusively for photographing a scale plate, and the output signal thereof is applied to the receiver 6 for producing its image thereon.

8. The camera 4 and the receiver 6 can be of the color type and this is effective to facilitate the surveying work, because the image 1*a* of the paved surface 1 can be clearly distinguished from the image 2*a* of the unpaved portion 2, especially when the unpaved portion 2 have a green color such as of trees, grass or the like.

What is claimed is:

1. An apparatus for surveying a paved surface having marginal edges separating the paved surface from the bordering unpaved surface, said apparatus comprising a vehicle, a television camera on said vehicle for viewing the vehicle and the paved and unpaved surfaces, a television receiver for receiving a signal from the camera and includng an image screen on which an image of the vehicle, the paved surface inclusive of its marginal edges, and the unpaved surface is received, a scale on said screen including a central mark and two lateral marks, paint applicator means on said vehicle, the arrangement of said vehicle, camera and marks being such that said marginal edges are aligned with said lateral marks and said applicator means with said central mark, and automatic control means operatively associated with said screen for detecting misalignment of the lateral marks and said marginal edges for correction of such misalignment and including photoelectric sensors adjacent said lateral marks for detecting shifting of the marginal edges relative to said lateral marks due to differences in brightness between the paved and unpaved surfaces.

2. An apparatus as claimed in claim 1 wherein a photographing lens of the television camera includes a wide-angle lens which has a long depth of focus.

3. An apparatus as claimed in claim 1 comprising a pilot light source in the viewing field of the camera means and serving as a point of reference on the image screen.

4. An apparatus as claimed in claim 3 wherein said pilot light source means comprises an infrared ray lamp, said television camera including an infrared filter.

5. An apparatus as claimed in claim 3 wherein said pilot light source means includes means for turning the same off and on.

* * * * *